United States Patent
Lo et al.

(10) Patent No.: US 9,633,234 B2
(45) Date of Patent: *Apr. 25, 2017

(54) SYSTEM AND METHOD FOR A SECURE DISPLAY MODULE

(71) Applicant: BBPOS LIMITED, Hong Kong (HK)

(72) Inventors: Chi Wah Lo, Hong Kong (HK); Hwai Sian Tsai, Hong Kong (HK)

(73) Assignee: BBPOS Limited, Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 15/044,925

(22) Filed: Feb. 16, 2016

(65) Prior Publication Data

US 2016/0247001 A1 Aug. 25, 2016

Related U.S. Application Data

(63) Continuation of application No. 14/178,174, filed on Feb. 11, 2014, now Pat. No. 9,264,228.

(60) Provisional application No. 61/764,584, filed on Feb. 14, 2013.

(51) Int. Cl.
| | |
|---|---|
| *H04L 29/06* | (2006.01) |
| *G06F 21/84* | (2013.01) |
| *H04L 9/08* | (2006.01) |
| *G06F 21/44* | (2013.01) |
| *G06F 21/60* | (2013.01) |
| *G09G 5/393* | (2006.01) |
| *H04L 9/32* | (2006.01) |

(52) U.S. Cl.
CPC ........... *G06F 21/84* (2013.01); *G06F 21/445* (2013.01); *G06F 21/606* (2013.01); *G09G 5/393* (2013.01); *H04L 9/0866* (2013.01); *H04L 9/0894* (2013.01); *G06F 2221/031* (2013.01); *G09G 2358/00* (2013.01); *H04L 9/3273* (2013.01)

(58) Field of Classification Search
CPC ....................................................... G06F 21/84
See application file for complete search history.

(56) References Cited

U.S. PATENT DOCUMENTS

| | | |
|---|---|---|
| 5,493,613 A | 2/1996 | Denno et al. |
| 6,222,926 B1 | 4/2001 | Cavallerano |
| 6,434,702 B1 * | 8/2002 | Maddalozzo, Jr. ... G06F 3/0238 382/115 |
| 6,549,194 B1 | 4/2003 | McIntyre |
| 7,298,850 B2 | 11/2007 | Whytock |
| 7,945,785 B2 | 5/2011 | Castaldi |

(Continued)

OTHER PUBLICATIONS

Roth, Volker, Kai Richter, and Rene Freidinger. "A PIN-entry method resilient against shoulder surfing." Proceedings of the 11th ACM conference on Computer and communications security. ACM, 2004.*

*Primary Examiner* — Shawnchoy Rahman
(74) *Attorney, Agent, or Firm* — Howison & Arnott, LLP

(57) ABSTRACT

A system for a secure display module includes a display element array, a driver controller, a communication interface, a host controller and a cryptographic engine. The display element array includes one or more segments, and the driver outputs are configured to drive the one or more segments, respectively. The host controller is configured to send commands and data to the driver controller via the communication interface and the cryptographic engine is configured to encrypt communication data between the display element array and the host controller.

8 Claims, 3 Drawing Sheets

(56) References Cited

U.S. PATENT DOCUMENTS

| | | | |
|---|---|---|---|
| 8,289,301 B2* | 10/2012 | Gover | G06F 3/1446 |
| | | | 345/1.1 |
| 8,456,429 B2 | 6/2013 | Whytock | |
| 2002/0062445 A1 | 5/2002 | Owada et al. | |
| 2002/0169959 A1 | 11/2002 | Hsu | |
| 2003/0037237 A1 | 2/2003 | Abgrall | |
| 2003/0058083 A1* | 3/2003 | Birchfield | B60R 25/104 |
| | | | 340/5.22 |
| 2004/0199628 A1 | 10/2004 | Wu | |
| 2005/0131839 A1* | 6/2005 | Cordery | G06Q 20/02 |
| | | | 705/78 |
| 2009/0119514 A1 | 5/2009 | Sawada | |
| 2010/0283586 A1 | 11/2010 | Ikeda | |
| 2011/0131470 A1* | 6/2011 | Kambayashi | G06F 21/79 |
| | | | 714/763 |
| 2012/0044236 A1* | 2/2012 | Nam | G09G 3/3611 |
| | | | 345/212 |
| 2012/0095919 A1 | 4/2012 | Hart | |
| 2013/0103190 A1 | 4/2013 | Carapelli | |

\* cited by examiner

SYSTEM AND METHOD FOR A SECURE DISPLAY MODULE

CROSS-REFERENCE TO RELATED APPLICATIONS

This application is a Continuation of U.S. patent application Ser. No. 14/178,174, filed on Feb. 11, 2014, entitled SYSTEM AND METHOD FOR A SECURE DISPLAY MODULE, published as U.S. Patent Application Publication No. 2014-0226815 on Aug. 14, 2014, and patented as U.S. Pat. No. 9,264,228 on Feb. 16, 2016. U.S. patent application Ser. No. 14/178,174 claims benefit of U.S. Provisional Application No. 61/764,584, filed on Feb. 14, 2013. U.S. patent application Ser. Nos. 14/178,174 and 61/764,584, U.S. Patent Application Publication No. 2014-0226815, and U.S. Pat. No. 9,264,228 are incorporated by reference herein in their entirety.

FIELD OF THE INVENTION

The present invention relates to a system and a method for a secure display module.

BACKGROUND OF THE INVENTION

There are many different display technologies available today. For example, in dot-matrix liquid crystal display (LCD) units, there is a grid of display elements pixels. In some other display modules, the display elements are made up of arrays of Light-emitting diodes (LEDs). In simpler displays, seven-segment, fourteen-segment, or sixteen-segment display units are used. There are even mechanical flip disc signs that can display images or text messages. In all the above examples, a controller is used to drive the display elements. For example, in LCDs, electronic controller driver integrated circuit (IC) is used to drive the liquid crystal display pixel on and off. This controller accepts a set of commands from a host microcontroller or processor that control the image or text to display. By tapping at the communication interface and reading the stream of commands, it is possible to deduce the image or message displayed.

In some applications, the information displayed is sensitive and it is desirable to protect the displayed information by making the communication channel between the display controller and the host controller secure, thereby making the commands incomprehensible. For example, in a payment application, by making the display unit secure, more information can be displayed and this simplifies the design of the other components. Accordingly, there is a need for a secure display module that can greatly simplify the design and reduce the cost of a secure application and products.

SUMMARY OF THE INVENTION

The invention presents a secure display module where the display controller includes a cryptographic engine to encrypt the commands sent to and from a host controller. By making the display secure, the design of a secure application can be greatly simplified.

In general, in one aspect, the invention provides a system for a secure display module including a display element array, a driver controller, a communication interface, a host controller and a cryptographic engine. The display element array includes one or more segments, and the driver outputs are configured to drive the one or more segments, respectively. The host controller is configured to send commands and data to the driver controller via the communication interface and the cryptographic engine is configured to encrypt communication data between the display element array and the host controller.

Implementations of this aspect of the invention may include one or more of the following features. Information displayed on the display element array comprises the commands and data sent from the host controller. The cryptographic engine stores one or more identification tokens for mutual authentication with the host controller. The cryptographic engine stores one or more cryptographic keys for cryptographic operations comprising one or more of data encryption, authentication, digital signature, or hashing. The one or more cryptographic keys may be fixed key, master-session key or Derived Unique Key Per Transaction (DUKPT). The display element array further includes elements comprising light-emitting diodes, seven-segment, fourteen-segment, sixteen-segment display elements, or mechanical flip disc display elements. The elements are in the form of pixels, line segments or icons. The system further includes a Personal Identification Number (PIN) pad and an application configured to display a randomized number grid in the display element array, and the PIN pad is used to enter positional information corresponding to the randomized number grid. The positional inputs on the PIN pad are configured to be sent to the display module and the display module is configured to decode the positional inputs into PIN digits and to generate an encrypted PIN and then to send the encrypted PIN back to the PIN pad.

In general, in another aspect, the invention provides a method for a secure display module including the following. First, providing a display element array comprising one or more segments. Next, providing a driver controller comprising driver outputs configured to drive the one or more segments, respectively. Next, providing a communication interface and a host controller configured to send commands and data to the driver controller via the communication interface. Next providing a cryptographic engine configured to encrypt communication data between the display element array and the host controller.

Among the advantages of this invention may be one or more of the following. By making the display secure, the design of a secure application can be greatly simplified.

The details of one or more embodiments of the invention are set forth in the accompanying drawings and description below. Other features, objects and advantages of the invention will be apparent from the following description of the preferred embodiments, the drawings and from the claims.

DETAILED DESCRIPTION OF THE INVENTION

Figure 1:
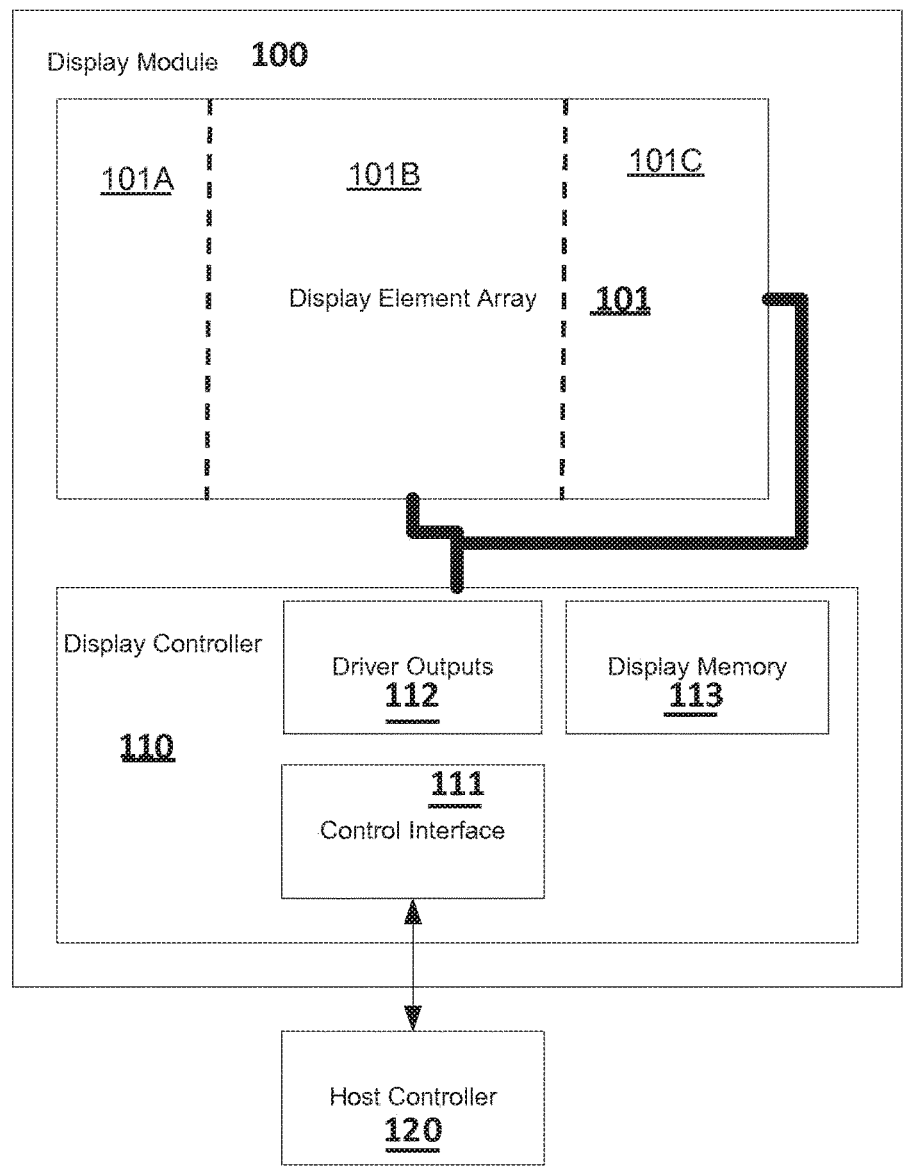
FIG. 1 shows a typical display module 100 with display memory, command interface and the driver outputs.

Referring to FIG. 1, in a typical display module 100, there is a display element array 101 where segments 101A, 101B, 101C are turned on or off by a set of driver outputs 112 according to a set of commands and data received from a host controller 120 through the control interface 111. The status of an element can either be stored in a display memory 113 or it can be stored in the state of the display element itself In one example, the state of a mechanical flip disc and electronic ink element retains its state unless altered. In this prior art display module 100, commands and data are sent to the display module 100 from the host controller 120 in plain text unencrypted form. Therefore, it is possible to deduce the image or text message displayed by looking at the sequence of commands and data.

Figure 2:
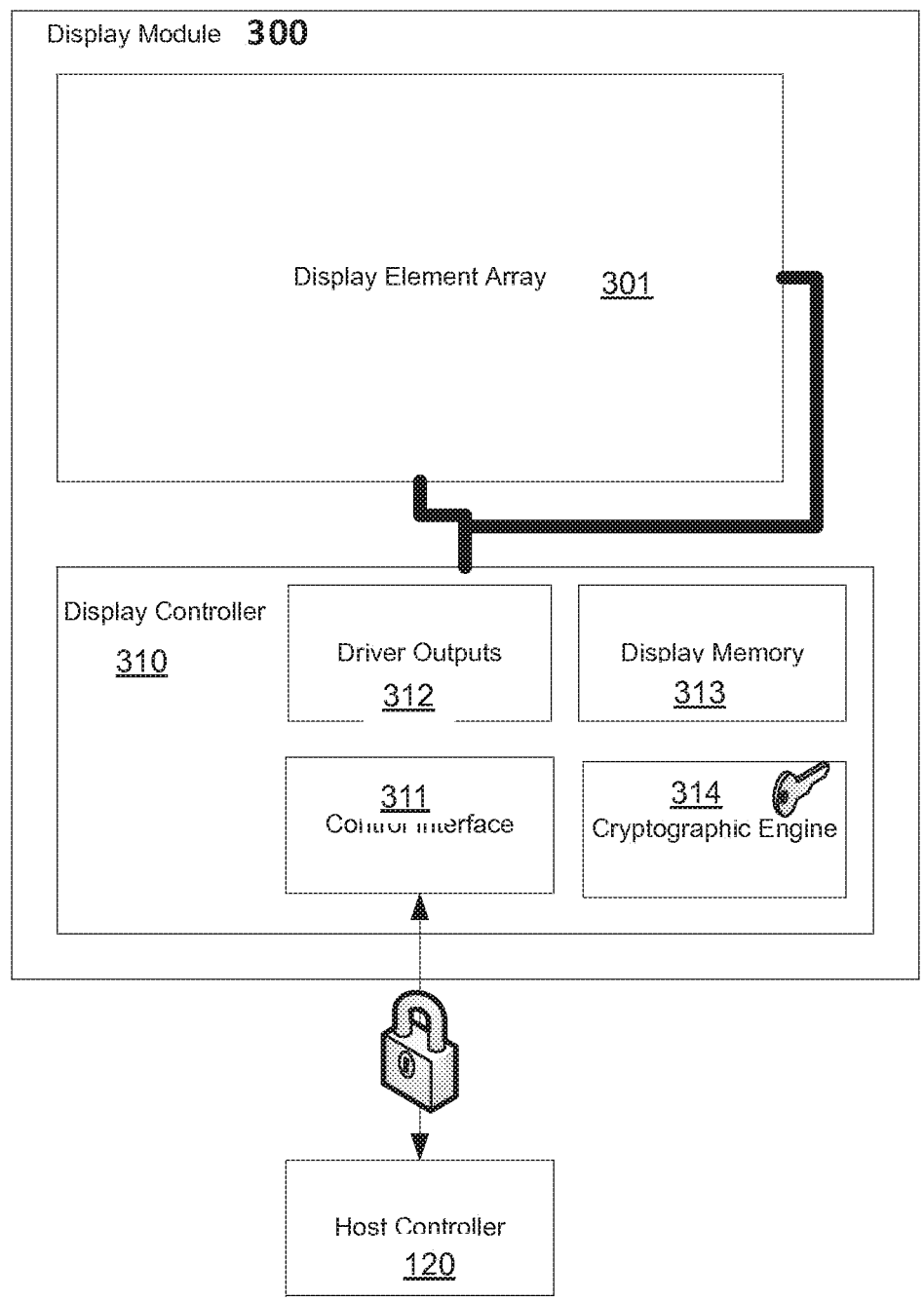
FIG. 2 shows a secure display module 300 according to this invention with display memory, command interface, driver outputs and a cryptographic unit.
Figure 3:
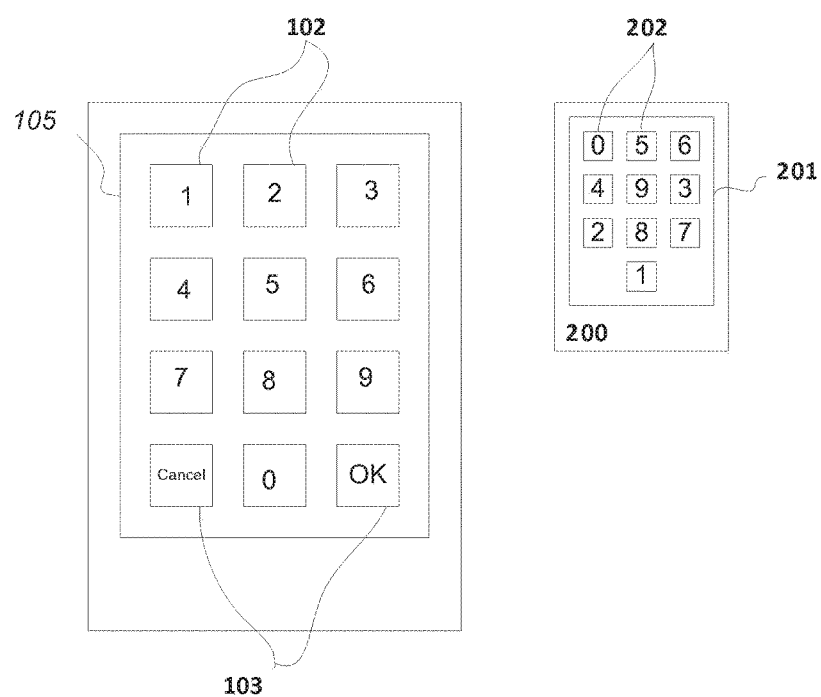
FIG. 3 shows a randomized key grid 201 and its numbered positions 202 shown on the secure display 101 and a standard PIN Pad 105.

In the present invention, commands and data are encrypted so that they are rendered incomprehensible without the proper cryptographic keys. Referring to FIG. 2, display module 300 includes a display element array 301 and a display controller 310. Display controller 310 includes driver outputs 312, a control interface 311, display memory 313 and a cryptographic engine 314. Cryptographic engine 314 provides a secure communication channel between the display controller 310 and the host controller 320. The cryptographic engine 314 stores a set of symmetric or asymmetric cryptographic keys that are used for key exchange, data encryption and data hashing.

In operation, the host controller 1320 and the display controller 310 first establish a key for data encryption. Different key schemes can be used including Fixed key, Master-Session key or Derived Unique Key Per Transaction (DUKPT). Next, data and commands are encrypted by the host controller 320 before sending them to the display controller 310. The display controller 310, upon receiving the encrypted commands and data, decrypts the encrypted commands and data and then carries out the intended operations such as updating the display memory and driver outputs.

One of the applications of the secure display module 300 is in the design of a personal identification number (PIN) entry device. Instead of strengthening the security level of the PIN pad, one can now rely on the security of the display. In the design, a randomized number grid 200 is displayed in display element array 301 and a PIN Pad 105 is used to enter positional information corresponding to the randomized number grid 200 instead of the PIN digits 102. In this way, a PIN can be captured securely in a standard PIN pad, keyboard or touch screen. The positional information, in combination with the displayed information on the secure display module, can give the entered digits and thus the PIN.

Several embodiments of the present invention have been described. Nevertheless, it will be understood that various modifications may be made without departing from the spirit and scope of the invention. Accordingly, other embodiments are within the scope of the following claims.

What is claimed is:

1. A display module comprising:
   a control interface configured to receive encrypted commands and encrypted data for display;
   a cryptographic engine coupled to the control interface, the encrypted commands and
   data received by the control interface being decrypted by the cryptographic engine to produce decrypted commands and decrypted data, the decrypted commands being executed by the control interface to control a plurality of display driver outputs;
   the plurality of driver outputs coupled to the control interface, the plurality of display driver outputs using the decrypted data to update the display array element with a randomized number grid; and
   a PIN pad for entering positional information corresponding to the randomized number grid.

2. The display module of claim 1 further comprising a display memory, the display memory storing the status of a portion of the display array element.

3. The display module of claim 1 wherein the status of a portion of the display array element is stored within a state of the display array element.

4. The display module of claim 1 wherein the cryptographic engine stores a key used for data encryption of the encrypted commands and data.

5. A method for operating a display module comprising:
   establishing, by a cryptographic engine, a key for data encryption between a control interface and an external device;
   receiving encrypted commands and encrypted data by the control interface;
   decrypting the encrypted commands using the key, by the cryptographic engine, to produce decrypted commands and decrypted data;
   executing the decrypted commands, by the control interface, to control a plurality of driver outputs to update a display array element using the decrypted data, the decrypted commands defining a randomized number grid; and
   receiving positional information input on a PIN pad corresponding to the randomized number grid.

6. The method of claim 5 further comprising storing in a display memory a status of a portion of the display array element.

7. The method of claim 5 further comprising storing within a state of the display array element a status of a portion of the display array element.

8. The method of claim 5 further comprising storing the key used for data encryption of the encrypted commands and data within the cryptographic engine.

* * * * *